United States Patent [19]

Delimoy

[11] Patent Number: 5,604,289

[45] Date of Patent: Feb. 18, 1997

[54] COMPOSITE THERMOPLASTIC MATERIAL AND METHOD OF MANUFACTURING ARTICLES BASED ON IT

[75] Inventor: Didier Delimoy, Chaumont-Gistoux, Belgium

[73] Assignee: Solvay (Société Anonyme), Brussels, Belgium

[21] Appl. No.: 388,830

[22] Filed: Feb. 15, 1995

[30] Foreign Application Priority Data

Mar. 1, 1994 [FR] France .................... 94 02433

[51] Int. Cl.$^6$ .................... C08K 3/04; C08K 7/14
[52] U.S. Cl. .................... 524/496; 524/495; 524/439; 524/440; 524/441; 524/452; 524/455; 523/214; 523/215; 523/217; 523/222
[58] Field of Search .................... 524/495, 496, 524/439, 440, 441, 452, 455, 494; 523/214, 215, 217, 222

[56] References Cited

U.S. PATENT DOCUMENTS

| | | | |
|---|---|---|---|
| 3,247,159 | 4/1966 | Pendleson et al. | 260/41 |
| 4,258,093 | 3/1981 | Benedyk | 428/85 |
| 4,420,581 | 12/1983 | McFarlane et al. | 525/444 |
| 4,481,314 | 11/1984 | Rule | 524/156 |
| 4,535,118 | 8/1985 | Pengilly | 524/496 |
| 4,536,531 | 8/1985 | Ogawa et al. | 524/452 |
| 4,925,889 | 5/1990 | Capolupo et al. | 524/169 |
| 5,112,901 | 5/1992 | Buchert et al. | 524/452 |
| 5,149,731 | 9/1992 | Uota et al. | 524/494 |
| 5,371,132 | 12/1994 | Ebara et al. | 524/494 |
| 5,371,134 | 12/1994 | Inoue | 524/452 |
| 5,384,357 | 1/1995 | Levinson et al. | 524/770 |
| 5,416,154 | 5/1995 | Ferdani | 524/494 |
| 5,419,936 | 5/1995 | Tindale | 524/440 |

FOREIGN PATENT DOCUMENTS

| | | |
|---|---|---|
| 0087373 | 8/1983 | European Pat. Off. . |
| 0309284 | 3/1989 | European Pat. Off. . |
| 1135928 | 12/1968 | United Kingdom . |
| 87/00563 | 1/1987 | WIPO . |

OTHER PUBLICATIONS

*Kirk–Othmer Encyclopedia of Chemical Technology*, Third Edition, vol. 4, "Carbon Fibers and Fabrics," pp. 622–625; Carbon Black, pp. 631–633; Natural Graphite, pp. 689–691.

*Primary Examiner*—Paul R. Michl
*Assistant Examiner*—Olga Asinovsky
*Attorney, Agent, or Firm*—Spencer & Frank

[57] ABSTRACT

Thermoplastic material comprising at least one thermoplastic polymer and 1 to 1000 ppm (by weight) of at least one substance which substantially absorbs infrared radiation, such as carbon black. The reinforcement-fibre bundles impregnated with a thermoplastic polymer, in accordance with the invention, are particularly advantageous for reinforcing pipes by filament winding.

6 Claims, No Drawings

COMPOSITE THERMOPLASTIC MATERIAL AND METHOD OF MANUFACTURING ARTICLES BASED ON IT

The present invention relates to a composite thermoplastic material, as well as to a method of manufacturing articles based on it.

In many methods for processing thermoplastic materials, these are raised, by means of infrared radiation, to a temperature sufficient to cause them to soften or for their surface to melt.

This thus applies, for example, during the thermoforming of flat articles, such as films, panels or sheets, during which these are heated before being shaped.

This also applies during the impregnation of a bundle of continuous reinforcement fibres with polymer powder. This technique, described especially in Patent Application WO 87/000563, consists in dispersing one or more polymers, in the powder state, between continuous fibres forming a bundle, and then in melting these polymers so as to enable them to flow between the fibres. A contactless heating method is preferably used, for example an infrared-radiation heating method.

However, most thermoplastic materials only absorb infrared radiation weakly, especially when they contain glass fibres whose emissivity is very high. As a result, the heating of such thermoplastic materials takes place slowly and with a poor energy efficiency, contrary to the economic necessities associated with any industrial production. This is why, in the known alternative forms of the technique of heating thermoplastic materials using infrared radiation, a significant amount, generally greater than one per cent by weight, of a substance which substantially absorbs this radiation, for example carbon black, is generally incorporated in the thermoplastic materials to be treated, for the purpose of increasing their thermal absorption and reducing their heating time.

However, the incorporation of a significant amount of absorbent substance has several drawbacks which essentially stem from the inhomogeneity of the temperature profile through the thickness of the thermoplastic material while it is being irradiated. If the amount of absorbent substance is high, the absorption of the radiation takes place almost solely at the surface of the thermoplastic material, this possibly leading to poor melting of its core and the appearance of internal stresses as well as, consequently, heterogeneities reducing the overall mechanical performance of the thermoplastic material. In particular, the adhesion of possible reinforcement fibres to the thermoplastic material into which they are incorporated may be reduced. Furthermore, absorption of most of the radiation at the surface considerably increases the time necessary complete melting of the thermoplastic material treated, this therefore being a disadvantage with regard to industrial efficiency and profitability.

It would be conceivable to use a higher heating power, but this could cause excessive overheating of the surface parts of the thermoplastic material and could degrade it thermally. Whatever the solution adopted, the result at best is a drop in productivity.

Furthermore, the presence of a non-negligible amount of a foreign substance within a thermoplastic material may cause a reduction in its mechanical performance.

The present invention consequently aims to provide a thermoplastic material which can be heated rapidly, homogeneously and economically and which leads to products having good mechanical properties.

More precisely, the present invention relates to a thermoplastic material, comprising at least one thermoplastic polymer and at least one substance which substantially absorbs infrared radiation, which is characterized in that it comprises 1 to 1,000 ppm by weight of absorbent substance.

Thermoplastic material is meant to designate any material based on a thermoplastic polymer or on a blend of several thermoplastic polymers. By way of non-limiting examples of thermoplastic polymers, mention may be made of polyolefins, vinyl polymers or polyamides. It is preferable to use polyolefins, in particular the homo-polymers and copolymers of ethylene or of propylene. In the thermoplastic material according to the invention, the polymer or polymers may be in any form, for example in the granular, powder, fibre or film state.

"Substance which substantially absorbs infrared radiation" is meant to designate a substance whose absorption at all the wavelengths forming the range of the infrared radiation, that is to say from 750 nm to 1 mm, is at least 50% of that of a black body. As long as this condition is fulfilled, the intended absorbent substance may be any substance; it may also involve a blend of several of such substances. When the absorbent substance has an absorption maximum, it is preferable that this maximum corresponds to a wavelength of the order of 1 to 10 µm. Nothing prevents an additive, added for a specific purpose, for example an inorganic filler or reinforcement fibres, from containing, or furthermore acting as, an absorbent substance. Glass fibres may especially be used, the sizing of which comprises an absorbent substance. In such cases, the amount of this additive must be taken into consideration in order to meet the proportions of the absorbent substance. If it is observed that a particular additive, added to the thermoplastic material for a specific purpose, absorbs infrared radiation, it may therefore be necessary to limit the amount of this additive in order to meet the proportions of absorbent substance, or to change it, so as to obtain a thermoplastic material in accordance with the invention. Preferably, the absorbent substance comprises carbon black.

The incorporation of the absorbent substance in the thermoplastic material may be accomplished by any known technique enabling an additive to be incorporated within a composition of polymer materials. The absorbent substance is generally employed in the state of a finely divided powder. It may especially be incorporated by cold mixing with one or more of the constituents of the thermoplastic material, also in the powder state. This powder blend may be used as it is, for example for the purpose of impregnating a bundle or fabric of reinforcement fibres, or else be pressed or extruded in order to form semi-finished products, such as fibres, panels, sheets, films, granules, etc.

The incorporation of the absorbent substance into the thermoplastic material may also be carried out in the molten state, that is to say after melting the latter in a suitable device, for example in an extruder or in a mixer. Preferably, it is carried out in an extruder.

Given the small amount of absorbent substance required in accordance with the invention, it may be suitable to incorporate the absorbent substance by employing the well known technique of masterbatching, which consists in mixing, with the constituents of the thermoplastic material, a small amount of a more concentrated preblend of the absorbent substance and of one or more of the constituents of the thermoplastic material. This thus makes it easier to meter and to disperse the absorbent substance.

Surprisingly, it has been found that the optimum concentration of absorbent substance was extremely low. According to the present invention, the minimum concentration of absorbent substance (expressed by weight of absorbent substance with respect to the total weight of the polymer material or materials present in the thermoplastic material) is approximately 1 ppm, preferably 5 ppm. Its maximum concentration is approximately 1000 ppm, preferably 100 ppm and particularly preferably 50 ppm. Of course, these concentrations may be influenced, especially by the nature of the absorbent substance, by parameters specific to the anticipated application, such as the thickness and the nature of the thermoplastic material, or even the type and quantity of possible reinforcement fibres.

The thermoplastic material according to the invention may possibly furthermore contain one or more known additives, such as in particular pigments, stabilizers, compatibilizers, processing aids, electrically conducting particles or inorganic fillers.

The thermoplastic materials of the invention may furthermore comprise one or more fibrous reinforcement components, for example glass, metal and/or aramid fibres. Glass fibres give excellent results. The thermoplastic materials thus reinforced may especially be in the form of bundles, braids, plies or fabrics of fibres, impregnated with one or more thermoplastic polymers, or of comingled fabrics or bundles of reinforcement fibres and thermoplastic fibres (comingled fibres).

As already explained, the intended thermoplastic materials may also be in the form of powder, or else in the form of semi-finished products, such as films, panels, sheets or fibres.

The incorporation of absorbent substance at such concentrations within a thermoplastic material offers particularly useful advantages in the case of reinforce-ment-fibre bundles or fabrics impregnated with one or more polymers, whether this involves their manufacture or their processing for the purpose of reinforcing other articles. In fact, it has been found that it is thus possible to obtain very homogeneous heating of the thermoplastic material, this guaranteeing excellent uniformity of its mechanical properties and considerably reducing the risk of thermal degradation. Furthermore, the heating is greatly accelerated, this resulting in a significant increase in productivity. Finally, the very small amount of absorbent substance does not affect the mechanical strength of the thermoplastic materials in accordance with the invention, this being particularly advantageous when they are in the form of small-diameter fibres intended, for example, to form comingled fabrics or bundles of reinforcement fibres and of fibres of a thermoplastic material.

As explained hereinabove, the thermoplastic materials in accordance with the invention have many advantageous applications, for example during the manufacture of reinforcement-fibre bundles, fabrics, braids or plies impregnated with thermoplastic polymer(s), either by heating reinforcement fibres between which one or more thermoplastic polymers in powder form have been dispersed, or by heating co-mingled bundles or fabrics of reinforcement fibres and of thermoplastic fibres; or else when processing such impregnated bundles and fabrics, when thermoforming flat articles, etc.

The invention is particularly advantageous in the case where the fibrous reinforcement component mentioned hereinabove comprises at least one bundle of individual fibres which is impregnated with at least one thermoplastic polymer. Preferably, the bundle of individual fibres, impregnated with thermoplastic polymer, comprises glass fibres.

The present invention also relates to a method of manufacturing an article made of thermoplastic material, in which the said material is subjected to infrared-radiation heating, which is characterized in that a thermoplastic material such as described hereinabove is used.

As explained previously, the method according to the invention can be used in many applications where it is necessary to cause a thermoplastic material to melt or to soften, for example when sleeving pipes, or else when manufacturing reinforcement-fibre fabrics, bundles, braids or plies impregnated with a thermoplastic polymer, even if these materials are thick. It also applies to the processing of these fibres and other impregnated articles that are commonly used to reinforce articles such as panels, pipes, etc. When processing them, it is in fact necessary to melt or soften the polymer present in the thermoplastic material in question, so as to guarantee its adhesion to the article to be reinforced, the external surface of which is generally preheated.

In particular, the present invention also relates to a method of manufacturing a pipe reinforced with a peripheral jacket comprising at least one fibrous
component impregnated with at least one thermoplastic polymer, which is characterized in that, in order to manufacture the said jacket, a thermoplastic material as defined hereinabove is employed and in that the jacket is produced around the pipe by heating the said material using infrared radiation.

The invention furthermore relates to the reinforced pipes thus obtained.

In this case, the technique called filament winding is intended, this consisting in winding around a pipe, in tight turns, one or more bundles of continuous reinforcement fibres, preferably glass fibres, these bundles being impregnated with at least one thermoplastic polymer, so as to produce a reinforcement jacket around the pipe. In order to guarantee good adhesion of the impregnated fibre bundles to the pipe on which they are wound, these bundles must be heated to a suitable temperature before they come into contact with the pipe. The application of the method described hereinabove to such a fibre bundle is therefore advantageous, since it makes it possible to increase its rate of heating and therefore the rate of manufacture of the reinforced pipes, or alternatively, for the same rate, to use shorter heaters. This is particularly useful as regards the construction of filament-winding machines which generally comprise a rotating table having a large diameter (sometimes more than one meter), coaxial with the axis of the pipe to be reinforced, which has to carry the bobbin(s) of impregnated reinforcement-fibre bundles as well as the corresponding number of heaters. The use of the heating method described consequently enables the size, and therefore the cost, of filament-winding machines to be reduced.

One particularly advantageous case of application of this method of manufacturing a pipe reinforced by filament winding is that where the pipe is made of a thermoplastic polymer of the same family as that of the jacket. In fact, when the pipe is made of a thermoplastic material of the same family as that impregnating the
reinforcement-fibre bundle(s) forming the jacket after processing, for example when these two plastics are preferably polyolefins, in particular homopolymers or copolymers of propylene or of ethylene, this results especially in good compatibility between the actual pipe and the reinforcement-fibre bundle, and in their melting points being close together. The filament winding is thereby facilitated, and guarantees good pipe/bundle adhesion as well as easy recyclability of the reinforced pipe.

Whatever the nature of the thermoplastic material, the heating may be carried out by means of any device emitting infrared radiation, for example a tung- sten-filament lamp. The irradiation time depends on several parameters specific to each application, such as, for example, the thickness of the thermoplastic material to be heated, the exact nature and amount of absorbent substance, the possible presence, and type, of reinforcement fibres, etc.

Preferably, the radiation used is short-wave infrared radiation. Short-wave infrared radiation is meant to designate radiation whose maximum emission peak has a wavelength less than approximately 6 μm, preferably less than 3 μm. Generally, the mean wavelength of this radiation is greater than 0.7 μm. Surprisingly, it has been found that such radiation, although weakly absorbed by most polymers, led to much more efficient heating of the thermoplastic materials in accordance with the invention.

The present invention also relates to articles consisting of at least one thermoplastic material, for example panels, reinforced by at least one impregnated reinforcement-fibre bundle, as defined hereinabove. In particular, the impregnated bundles in accordance with the invention turn out to be particularly useful for reinforcing pipes made of thermoplastic material; in this way, pipes are obtained which have a remarkable resistance to internal pressure.

When reinforcing these articles, it is necessary to heat these bundles before applying them to the articles to be reinforced. The ease with which the impregnated bundles in accordance with the invention may be heated leads to an increased productivity and guarantees excellent adhesion between the reinforcement fibres and their matrix, and therefore, ultimately, between the reinforcement fibres and the article to be reinforced

EXAMPLES

The examples which follow illustrate, in a non-limiting manner, the manufacture of thermoplastic materials reinforced with continuous glass fibres, in accordance with the invention. In order to do this, a thermoplastic material in the powder state is dispersed between the glass fibres, this powder being in suspension in a carrier gas (air) in a fluidized bed (by means of an apparatus of the FLEXLINE® trademark). After dispersing the powder between the glass fibres, these are passed into an oven so as to melt the thermoplastic material and impregnate the glass-fibre bundle with it. This oven is of the short-wave infrared type whose nominal emission occurs at a wavelength of 1.5 μm. The product thus obtained is then cooled and sized.

The thermoplastic material used is a homopolymer of propylene, of the ELTEX® HY trademark, marketed by SOLVAY (MI (230° C. 2.16 kg): 45 g/10 min). The glass fibres are of the direct-assemble roving type having a linear mass of 2.4 g/m and a diameter of approximately 17 μm per filament. The nominal concentration of glass fibres in the final product thus obtained is approximately 65% by weight.

Examples 1R and 2R are given by way of comparison; Example 3 is in accordance with the invention.

Example 1R

Without using any absorbent substance, the rate of manufacture permitting formation of a glass-fibre bundle correctly impregnated with the thermoplastic material is approximately 25 m/min.

Example 2R

Added to the powder of thermoplastic material, under the same operating conditions as above, is 0.5% by weight of carbon black (with respect to the thermoplastic material). Under these conditions, it was possible to double the rate of manufacture; however, the product thus obtained was not homogeneous. Delamination of the surface layers with respect to the central part was observed, especially while it was being cooled and sized.

Example 3

The incorporation of carbon black in concentrations of between 5 and 10 ppm makes it possible to obtain, under the operating conditions described hereinabove and at a rate of manufacture of 45 m/min, an impregnated bundle whose homogeneity—especially the dispersion and quality of the glass-fibre impregnation—is at least equal to that of the impregnated bundle obtained in Example 1R.

I claim:

1. In a method of manufacturing an article made of thermoplastic material comprising at least one thermoplastic polymer, at least one fibrous reinforcement component, and from 1 to 1,000 ppm by weight of carbon black as infrared radiation absorbent, the improvement comprising heating said thermoplastic material with infrared radiation.

2. The method of manufacturing an article made of thermoplastic material according to claim 1, wherein the fibrous reinforcement component comprises glass fibres.

3. The method of manufacturing an article made of thermoplastic material according to claim 1, wherein the fibrous component comprises at least one bundle of individual fibres which is impregnated with at least one thermoplastic polymer.

4. The method according to claim 1, in which the radiation is short-wave infrared radiation.

5. The method according to claim 1, wherein said infrared radiation comprises wave lengths from 750 nm to 1 mm.

6. The method according to claim 4, wherein said short-wave infrared radiation has a maximum emission peak between 0.7 and 6 μm.

* * * * *